W. R. TULLOSS.
METHOD OF AND APPARATUS FOR PLANTING GRAIN.
APPLICATION FILED JUNE 27, 1918.
1,311,427. Patented July 29, 1919.
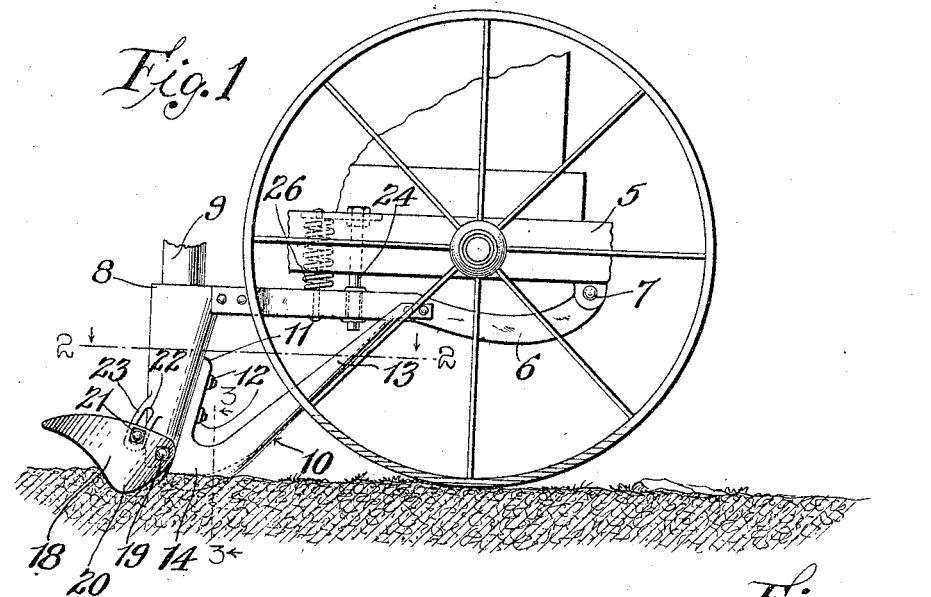
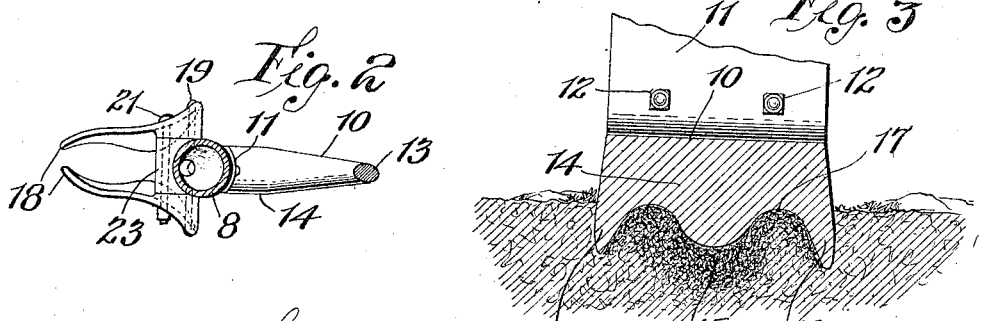
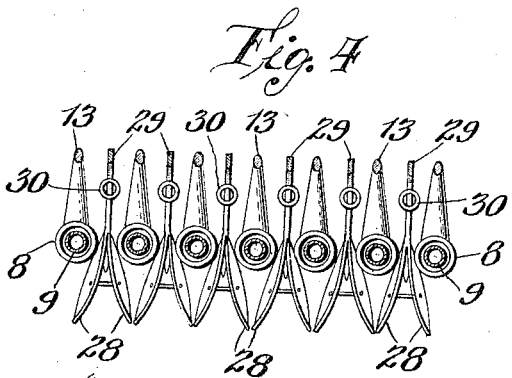
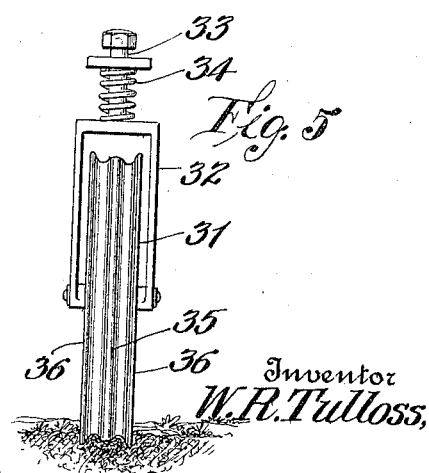

UNITED STATES PATENT OFFICE.

WILLIAM R. TULLOSS, OF WASHINGTON, DISTRICT OF COLUMBIA.

METHOD OF AND APPARATUS FOR PLANTING GRAIN.

1,311,427.  Specification of Letters Patent.  Patented July 29, 1919.

Application filed June 27, 1918. Serial No. 242,146.

*To all whom it may concern:*

Be it known that WILLIAM R. TULLOSS, a citizen of the United States, residing at Washington, District of Columbia, has invented certain new and useful Improvements in Methods of and Apparatus for Planting Grain, of which the following is a specification.

This invention relates to an improved method of and apparatus for planting grain, and has for its primary object to provide a new method of grain planting whereby partial failure of the crop due to the caking of the silt over the grain, which precludes the possibility of the germinating grain breaking through the soil, will be obviated.

It is generally recognized that crop failures, to a large extent, result from killing of the partially germinated seed caused by restriction of the flow of the plant juices which results from packing or caking of the soil upon the immature plant. In the trench system of planting, which is in very general use in the planting of wheat and similar grain crops, overabundant water precipitation causes the trenches in which the seed is deposited to become flooded, and, as no drains are provided for the trenches, the germinated seed or young plants are smothered.

It is therefore the purpose of my present invention to provide a new method and apparatus for planting grain, whereby crop failures will be reduced to a minimum, and the unrestricted growth of the grain seed assured.

The invention has for a more particular object to provide a bed for the seed of compressed soil so that the seepage of moisture into the compressed soil will cause the same to expand, rising to the normal ground level, thereby raising the seed and loosening the covering soil which is deposited in the trench or furrow over the seed.

It is also an object of the invention to provide a method of planting grain whereby in the formation of the seed bed, as above indicated, drains are likewise formed at each side of the bed, which prevent the collection of water and silt in excessive quantity in the seed receiving trench or furrow.

And it is finally a secondary object of my invention to provide an improved machine or apparatus for carrying out my improved method of planting which is simple and inexpensive in its construction, and the several parts of which may be properly adjusted and positioned to produce the desired compressed bed for the seed and to also properly cover the seed after it has been deposited.

Having the aforementioned objects in view, the present invention comprehends certain novel and improved steps in the method of planting grain together with an improved combination of mechanical elements, and structural characteristics thereof, as will be more fully developed in the following description and subsequently incorporated in the subjoined claims.

Referring to the accompanying drawings, in which like reference characters designate corresponding parts throughout the several views,—

Figure 1 is a side elevation of a planting machine illustrating one embodiment of the invention;

Fig. 2 is a section taken on the line 2—2 of Fig. 1;

Fig. 3 is a section taken on the line 3—3 of Fig. 1;

Fig. 4 is a plan view illustrating the invention applied to a wheat drill;

Fig. 5 is a detail elevation illustrating a modification; and

Fig. 6 is a transverse section through the seed bed showing the seed therein and the covering soil deposited in the trench.

Referring in detail to the accompanying drawing, which it is to be understood is merely illustrative of the mechanical means whereby the method constituting a part of the present invention may be successfully practised, 5 designates the frame of a planting machine which is mounted in any conventional manner upon suitable ground wheels. A longitudinally extending beam 6 is pivotally connected at its forward end as at 7 to the frame 5 and extends rearwardly beneath said frame. Upon the rear end of the beam 6 a seed depositing boot 8 is suitably mounted or supported, and in the upper end of this boot, the seed spout or tube 9 extending downwardly from a seed hopper (not shown) is disposed.

A seed-bed-forming casting 10 is provided with an angular arm 11 which is bolted as at 12 to the front side of the seed boot 8. This casting is also formed with a relatively long tapering shank 13 which is securely fixed at its upper end to the beam 6. The end 12 of this casting, which integrally connects the arm 11 and the shank 13, is centrally formed at its lower side with a longitudinally curved convex rib 15 and the outwardly flaring flanges 16 at each side of said rib. Thus the longitudinally curved grooves or channels 17 are produced between the rib 15 and the flanges 16. The ground engaging face of the nose 14 projects below the lower open end of the boot 8 and is adapted to exert a compressing action upon the soil as will be more clearly brought out in the following description.

To each side of the boot 8 at its lower end, the rearwardly projecting covering blades or wings 18 are connected by means of the pivot bolt 19. The rear ends of these wings, which extend above the ground surface, are curved inwardly toward each other as seen in Fig. 2, while their lower forward end portions indicated at 20 cut into the surface of the soil outwardly of the line of movement of the flanges 16. The covering blades 18 may be vertically adjusted to regulate the depth of penetration of the portions 20 thereof, and for this purpose I provide a bolt 21 connecting said blades, which is adjustable in a curved slot 22 formed in an arm or lug 23 on the seed boot 8. A suitable clamping nut is threaded upon one end of said bolt whereby the covering blades may be securely clamped and held in their adjusted positions.

The longitudinal beam 6 is vertically movable upon a guide bolt or rod 24 fixed at its upper end in the machine frame 5. A coiled spring 26 has a bearing at one of its ends in said frame, and at its other end is engaged with the beam 6 to yieldingly urge said beam downwardly and thereby maintain the desired pressure of the nose 14 upon the soil. Any suitable means may be provided for regulating the tension of this spring.

In the operation of the machine above described, it will be apparent that in the movement thereof the rib 15 of the nose 14 will form a shallow trench in the surface of the soil and compress the soil more or less tightly. The lateral or sidewise displacement or spreading of the soil is prevented by the flanges 16 on said nose so that the trench will be flanked on either side thereof by ridges of compressed soil. As this compressed bed for the seed is formed in the progress of the machine across the field, the grain seed is fed by means of any conventional mechanism into the boot 8 and deposited from the lower end thereof upon the compressed surface of the bed. The covering blades 18 gather the soil at the opposite sides of the compressed ridges and direct the same inwardly upon the seed bed to entirely cover the grain seed which has been deposited therein, and form a slight mound above the normal ground level, as seen in Fig. 6 of the drawing. This covering soil is relatively loose, though, if desired, a wheel or other suitable means may be mounted rearwardly of the covering blades 18 to slightly compact the covering soil. It is to be understood, however, that this latter feature is not essential to the successful practice of the present invention. The heel portions 20 of the covering blades 18 enter the soil to a sufficient depth to form a drainage channel at the outer side of each compressed ridge of soil which is of greater depth than the depth of the seed bed. Thus all possibility of melting snow and ice, which may collect in the draingage channel, seeping through the compressed ridges of soil into the seed bed, will be obviated.

In Fig. 4 of the drawing I have illustrated in plan, a drill for planting wheat or other seed wherein the depositing boots 27 are arranged in a series or gang of any desired number. In the application of my invention to drills as distinguished from planters, such as are used for the planting of grain wherein a single depositing boot is mounted at either side of the machine, I preferably arrange the covering blades 28 in pairs between the adjacent boots 27. These blades are either formed integral with or suitably secured to a bar 29 extending longitudinally between the seed-bed-forming castings, which are fixed to the depositing boots, and are curved in relatively opposite direction to throw the top soil into the adjacent seed beds or trenches. The bars 29 and the covering blades carried thereby are yieldingly urged downwardly by coiled springs indicated at 30, the rear ends of said bars penetrating the soil and loosening the same so that it will be collected by the covering blades. This independent mounting of the covering blades is desirable in order to enable the depositing boots to be properly adjusted with respect to the covering blades. In either adaptation of my invention the seed-bed-forming castings when they encounter rocks or other obstructions, will safely ride over the same and then be again returned to their normal positions by the springs 26.

In Fig. 5 of the drawing, I have illustrated an alternative means for forming the seed bed wherein a wheel generally designated by the numeral 31 is mounted in a suitable support or yoke 32 having a vertically disposed axis 33 rotatably mounted or supported in the machine frame. A coiled spring 34 is arranged upon this axis between the frame of the machine and yoke 32 to effect the requisite pressure of the wheel 31 upon the soil. This wheel may be formed with an integral centrally located circumferentially extending rib 35 which forms the seed bed or said rib may be separately constructed and suitably fixed to the periphery of the wheel. The wheel 31 is likewise provided with the annular side flanges 36 corresponding to the flanges 16 of the seed-bed-forming nose 14 above described. In the use of this seed-bed-forming wheel the trench to receive the seeds and the compressed ridges of soil at the opposite sides thereof are formed in identically the same manner as in the use of the fixed nose 14.

In the practice of my invention, there is secured a seed bed, the mechanical and physical condition of which is such as to insure against the excessive saturation of the soil constituting the seed bed, with moisture. By preventing the collection of too much water in the seed receiving trench, the proper germination of the plant seeds is insured. The compressed ridges of earth at opposite sides of the seed receiving bed form drains to direct the excess water away from the trench in which the seed has been deposited, and into the relatively loose soil outwardly of said ridges. Thus silt will not be washed down into the trench or bed in sufficient quantity to form a hard crust under the action of heavy rains followed by winds and excessive heat, which would produce a hard, impenetrable covering over the germinating seeds. On the contrary, by depositing the seed upon a compressed bed of soil, the excess moisture penetrating or seeping into this compressed soil will cause the same to expand and tend to return to the normal ground level. The seed will thereby be raised or elevated above the ground level, and the soil above the seed will constitute a roof or watershed so that excessive rain precipitation will be directed into the side drains or furrows formed by the flanges 16 which are at an appreciably lower elevation than the seed. Thus, an even and proper temperature of the seed bed is insured so that the process of germination will not be checked. By thus also obviating the settling of silt over the germinating seeds the possibility of the formation of an impenetrable crust over the seed which would preclude the sprouting of the grain to the sun and air, is obviated. If the grain sprouts should manage to break through the crust or caked soil, the excessive pressure of this hard baked covering soil upon the tender and yielding plants would restrict the flow of the plant juices and overabundant water precipitation would in all probability result in the smothering of the young plants, and might possibly extend to the absolute destruction of the plant life. By means of the present invention this condition cannot possibly exist, except under the most unusual circumstances, such, for instance, as when the entire field, which has been planted, should have become covered by water, and proper and adequate drainage cannot be provided. My improved method of planting will, however, provide an effective guard against serious injury to the plant life even in the case of excessive and prolonged rains, because, as above pointed out, the water cannot possibly collect in the seed bed in excessive quantity with the disastrous results above referred to.

From the foregoing description, taken in connection with the accompanying drawings, it is thought that my improved method and the manner in which the same is to be carried out in practice, can be clearly and fully understood. In the preceding description and the accompanying drawing, I have disclosed one practical embodiment of the invention, which, however, may likewise be exemplified in numerous alternative constructions. Accordingly, the invention, as herein claimed, is to be construed as inclusive of all legitimate equivalents for the various elements recited, as well as other contemplated arrangements thereof which may satisfactorily accomplish the desired results. The present invention is also particularly advantageous in the planting of winter wheat as it prevents the collection and freezing of water in the seed receiving trench. By the expansion of the seed bed the seed is raised above the side drains in which water, snow and ice will collect.

It is a well known fact that winter wheat is killed principally by the freezing of water and snow, and the formation of ice in the seed trench. Air is essential in order to sustain the life of the seed. The ice cake in the trench forms an impassible barrier, and as a consequence the germinated seed is killed. By means of the present invention, the compressed ridges of soil at each side of the seed-receiving trench formed by means of the shoe, serve to direct the melting snow and water away from the seed trench and into the side drain channels formed by the outer flanges 16 of the shoe as seen in Fig. 6 of the drawing. The water collecting and freezing in these channels cannot possibly choke the plant by preventing the access of air thereto through the mound of relatively loose soil extending between the ridges and above the ground level. This is a very important feature of my invention, and, insofar as I am aware, the desired result has never been heretofore attained.

What I claim is:—

1. The method of planting which consists in first forming compressed parallel ridges in the soil and a drain channel at the outer side of each of said ridges, secondly, depositing the seed between the compressed ridges of soil, and finally, filling the space between said ridges over the seed with relatively loose soil.

2. The method of planting which consists in first forming a seed receiving trench by compressing the soil and preventing lateral spreading thereof to thereby produce a ridge of compressed soil at each side of the trench, secondly, depositing the seed in the trench so formed, and finally filling the trench with a relatively loose soil.

3. The method of planting which consists in first depressing the soil to form a seed-receiving trench and preventing lateral spreading of the soil at each side of the trench so formed to thereby produce a ridge of compressed soil at each side of the trench, then depositing the seed in the trench so formed, and finally filling the space between the ridges and over the seed with relatively loose soil from the outer side of each ridge to thereby form drainage channels.

4. The method of planting which consists in first depressing the soil and preventing lateral spreading thereof to form a seed receiving trench having the soil of its base and side walls in a compressed state, secondly, depositing the seed upon the base wall of the trench so formed, and finally filling the trench to a depth above the surrounding ground level with relatively loose soil.

5. The method of planting which consists in first depressing the soil to form a seed receiving trench and a ridge at each side thereof the walls of which are in a compressed state, secondly, depositing the seed in said trench, and finally filling the trench and covering said ridges with a relatively loose soil.

6. The method of planting which consists in first depressing the soil and preventing lateral spreading thereof to form a seed bed having compressed base and side walls, secondly, depositing the seed upon the compressed soil, and finally covering the seed with the relatively loose soil at each side of the trench and forming a drainage channel at each side of the trench which is of greater depth than the seed bed.

7. The method of planting which consists in first depressing the soil to form a seed-receiving trench and ridges at the opposite sides thereof and compressing the soil at the base of the trench and at each side of said ridges and forming a drain channel in the soil at the outer side of each ridge to drain the water away from the trench, then depositing the seed in said trench, and finally, filling the space between said ridges and over the seed with relatively loose soil to a depth above the surrounding ground level.

8. In a seed planter, a soil depressing shoe operating to form a seed-receiving trench of compressed soil, said shoe having means to prevent lateral spreading of the soil displaced from the trench and forming a ridge of compressed soil at each side of the trench, means for depositing the seed in said trench, and means for excavating the soil at the outer side of each ridge to form a drainage channel and for directing the excavated soil into the trench and upon the seed.

9. In a seed planter, a soil depressing shoe operating to form a seed-receiving trench of compressed soil, said shoe, having means to prevent lateral spreading of the soil displaced from the trench and forming a ridge of compressed soil at each side of the trench, means for depositing the seed in said trench, and vertically adjustable covering blades engaging the ground outwardly of said ridges to direct relatively loose soil into the trench and cover the seed and said ridges to a depth above the normal ground level.

In testimony whereof I affix my signature.

WILLIAM R. TULLOSS.

Copies of this patent may be obtained for five cents each, by addressing the "Commissioner of Patents, Washington, D. C."